T. L. STURTEVANT.
SEPARATOR.
APPLICATION FILED JAN. 5, 1920.

1,397,337.

Patented Nov. 15, 1921.
5 SHEETS—SHEET 1.

Fig. 1

T. L. STURTEVANT.
SEPARATOR.
APPLICATION FILED JAN. 5, 1920.

1,397,337.

Patented Nov. 15, 1921.
5 SHEETS—SHEET 3.

T. L. STURTEVANT.
SEPARATOR.
APPLICATION FILED JAN. 5, 1920.

1,397,337.

Patented Nov. 15, 1921.
5 SHEETS—SHEET 4.

T. L. STURTEVANT.
SEPARATOR.
APPLICATION FILED JAN. 5, 1920.

1,397,337.

Patented Nov. 15, 1921.
5 SHEETS—SHEET 5.

UNITED STATES PATENT OFFICE.

THOMAS L. STURTEVANT, OF QUINCY, MASSACHUSETTS, ASSIGNOR TO STURTEVANT MILL COMPANY, OF BOSTON, MASSACHUSETTS, A CORPORATION OF MASSACHUSETTS.

SEPARATOR.

1,397,337.   Specification of Letters Patent.   Patented Nov. 15, 1921.

Application filed January 5, 1920. Serial No. 349,497.

*To all whom it may concern:*

Be it known that I, THOMAS L. STURTEVANT, a citizen of the United States, residing at Quincy, in the county of Norfolk and State of Massachusetts, have invented an Improvement in Separators, of which the following description, in connection with the accompanying drawings, is a specification, like characters on the drawings representing like parts.

The invention to be hereinafter described relates to separators for grading materials, and more particularly to separators employing vibratory screens.

These separators are employed for grading a great variety of materials, some of which are dry and readily pulverulent, and others of which are of a cohesive or adhesive character such that they tend to ball up and pass over the screen without being graded thereby. Also, these cohesive materials tend to clog and stick to the screen so as to close the meshes thereof and materially reduce the efficiency of the screens.

One of the purposes of the present invention is to provide a highly efficient screen vibrating mechanism which violently shakes the screen by a peculiar motion which effectively maintains the meshes of the screen in open condition for grading the materials, and enables either very fine or coarse materials to be graded whether in moist or dry condition, and in fact, enables classification of materials which heretofore could not be screened.

The vibrating mechanism, in the present instance, gives the screen up and down and lateral vibratory movements, and combination or resultant movements such that the entire area of the screen clothing is vigorously shaken.

Heretofore, in separators of this type, it has been customary to stretch the screen clothing tightly on a frame. This necessarily stretches the wires of the clothing and weakens the same, particularly where very fine copper wire mesh clothing is employed. Also, when the tensioned clothing is vibrated, it flexes up and down at the juncture of the cloth with the inner edges of the frame, thereby materially weakening the clothing and eventually rupturing the same.

One of the purposes of the present invention is to provide a screen having the clothing secured to its frame, but without stretching the clothing. This enables the clothing to experience a more pronounced vibratory movement and of greater amplitude than heretofore, with the result that the materials are tossed or thrown about above the screen and pass repeatedly over the area of the screen, so that the screen really has the grading effect of a larger screen. In the present instance, the character of the vibratory motion of the clothing is such that the materials on sliding down along the screen are tossed upward and backward, so that they roll down over the same portions of the screen more than once, and in being thus tossed upwardly, they meet other materials coming down the screen, and the impact of the materials against each other tends to break the same up into small particles, so that a greater percentage of fines will pass through the screen, and a smaller percentage of tailings will need to be returned to the breaker or pulverizer machine. The lateral vibratory movements of the screen similarly tend to throw the materials sidewise along the screen, so that the screen has the grading effect of a wider screen. The materials in being tossed from side to side are thrown against each other, and their impact further tends to break up the materials and increase the percentage of fines passing through the screen.

Another feature of the invention consists in the provision of a foundation frame which is mounted on and supported by cams provided with ridges or humps at intervals which engage followers on the frame and thump or kick the foundation frame upward and laterally with sharp, quick movements. The screen may be mounted on the foundation frame and secured thereto, and as a consequence, the motions of the foundation frame are transmitted to the screen. The foundation frame may be of a resilient character such that a hump applied thereto from one of the projections of one of the cams will energize or vibrate the foundation frame throughout, and the vibratory movements will be transmitted to the screen mounted thereon. The cams may be so timed that the thumps or kicks from the cam projections of the foundation frame will be out of step, and each projection, therefore, may thump the foundation frame and cause the latter to vibrate throughout and transmit its vibration to the screen throughout. The succession of thumps or kicks imparted by the cams to the foundation frame and screen may set up a complex vibratory motion of the screen such that the latter will be shaken in practically every direction.

Another important feature of the invention consists in the provision of means opposed to the screen clothing, the relative disposition of the two being such that when the foundation frame and screen are thumped and vibrated as described, the screen clothing will slap against said means, and since the clothing is not tensioned and has a considerable amplitude of movement, it will slap or flap against said means with a force such that the materials cannot lodge in and clog the meshes of the clothing, but will be positively shaken therefrom, and consequently the meshes throughout the area of the screen will be maintained in open condition for efficient grading effect.

In the present instance, the means opposed to the clothing is in the form of a woven wire support having a large mesh and preferably much larger than the mesh of the screen clothing associated therewith.

Certain materials to be graded, such, for example, as burlap and fish scrap have a fibrous character which causes such materials to tend to hang down like strings from the screen clothing and reduce the efficiency thereof. The lateral vibratory motion imparted to the clothing serves desirably to tend to shear off such strings, and thereby prevents clogging of the screen and reduction in the efficiency thereof by such materials.

The character of the invention may be best understood by reference to the following description of one good form thereof shown in the accompanying drawings, wherein:—

Fig. 2 is a vertical longitudinal section through the separator;

Fig. 3 is a detail to be referred to;

Referring to the drawings, the separator shown therein as one good form of the invention comprises a casing 1 having a cover 3 hinged to the upper end of the casing. Mounted on the top of the casing is a feed box 5 containing the usual screw (not shown) for feeding the materials along the box and over the usual feed board. The materials fall thence downward over a spill board 7 onto the upper surface of the screen mounted in the casing.

Figures 2, 3:
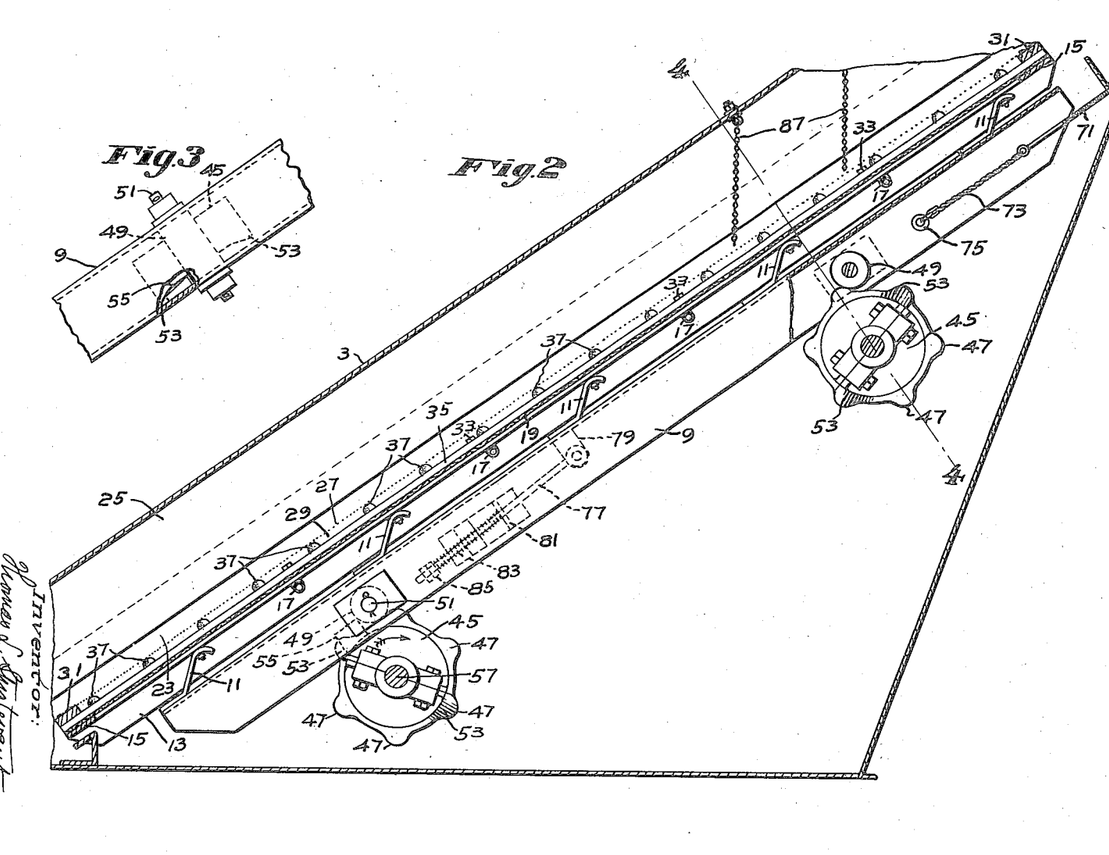
Figure 4:
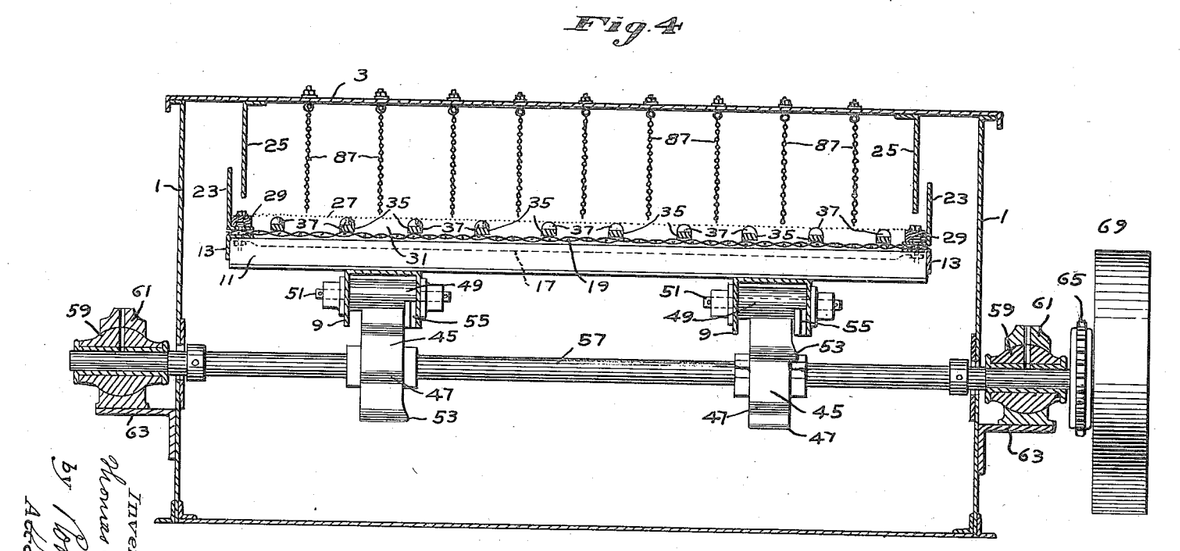
Fig. 4 is a transverse section taken on line 4—4 of Fig. 2.
Figure 5:
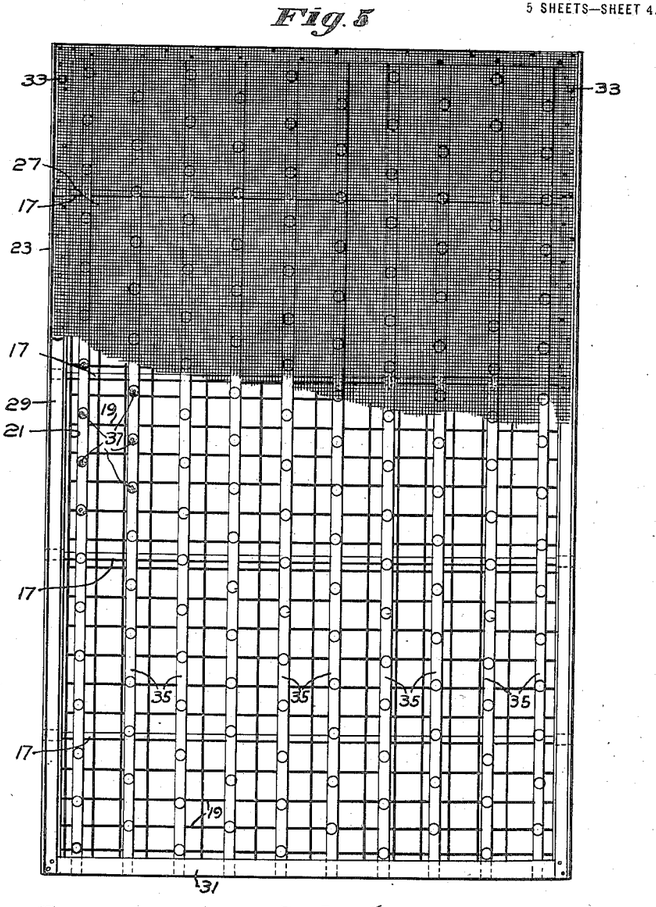
Fig. 5 is a plan of the screen mounted on the foundation frame, a portion of the screen clothing being broken away to disclose parts beneath the same.
Figure 6:
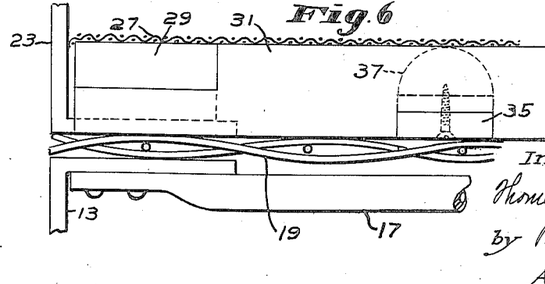
Fig. 6 on an enlarged scale is a partial end elevation of the construction shown in Fig. 5.

As stated, the invention contemplates the provision of a foundation member to support the screen and transmit vibratory movements thereto. This member, in the present instance, comprises a lower frame having a pair of longitudinal channels 9 (Figs. 2 and 4) connected by transverse bars or members 11 preferably of substantial width and having edges secured to the backs of the channels, and portions inclined upward away from said channels and terminating in curved marginal portions forming yielding, supporting surfaces spaced from the channels. The lower frame consisting of the longitudinal channels 9 and transverse bars 11, is preferably resilient throughout, the resiliency of the same being largely due to the construction whereby the end portions of the bars 11 project substantial distances beyond the point where these bars are secured to the longitudinal channel, and also due to the upward inclination of portions of the transverse bars away from the channels. This resilient frame constitutes what may be called a saddle, and mounted upon the same is an upper frame comprising longitudinal angle bars 13 having depending flanges and held in spaced relation by transverse end bars or members 15. The longitudinal members of the upper frame may be secured by bolts or other appropriate means to the curved marginal portions of the transverse members 11 of the lower frame or saddle. The side bars 13 may be braced apart by transverse members 17 conveniently of tubular form having flattened ends riveted or otherwise secured to the side angle bars 13. These brace bars 17 are preferably resilient and are distributed at appropriate intervals between the end bars of the upper frame.

As stated, the present invention contemplates the provision of means opposed to the screen clothing for the latter to slap against on vibration of the foundation frame to maintain the meshes of the screen in open condition. This means, in the present instance, is in the form of a fabric 19 preferably of heavy woven wire having a mesh considerably larger than the mesh of the screen for grading the materials. The margins of this supporting and vibration promoting fabric may be appropriately secured to the upper frame, and in the present instance, the side margins of the fabric are confined by bolts 20 between the side members 13 of the upper frame and inturned flanges 21 of plates 23 rising upward a substantial distance from the fabric 19 and serving to prevent escape of materials over the side edges of the screen. Coöperating with the side plates 23 for this purpose are plates 25 (Fig. 4) secured to and depending from the cover of the casing and overlapping the plates 23 a substantial extent.

Figure 7:
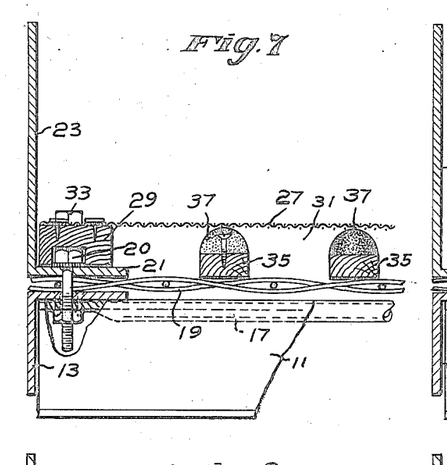
Fig. 7 is a partial transverse section through the screen and its supporting frame.

Fine or coarse screens may be employed for grading the materials according to the purposes required. In the present instance, a screen is shown comprising fine screen clothing 27 (Fig. 7) having its margins secured to a frame comprising side bars 29 and end bars 31 of wood or other suitable material. This screen clothing is placed on the frame and secured thereto preferably without materially stretching or tensioning the clothing. The screen frame may be detachably secured to the upper frame by bolts 33, the construction being such that the screen may be readily removed when worn and another substituted therefor, and screens of any desired size of mesh may be employed as desired.

Figure 8:
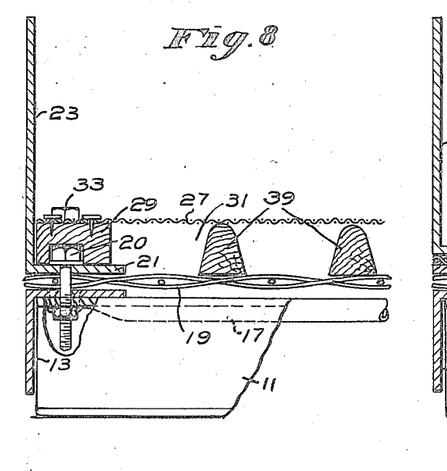
Fig. 8 is a view similar to Fig. 7 showing a slightly modified construction.
Figure 9:
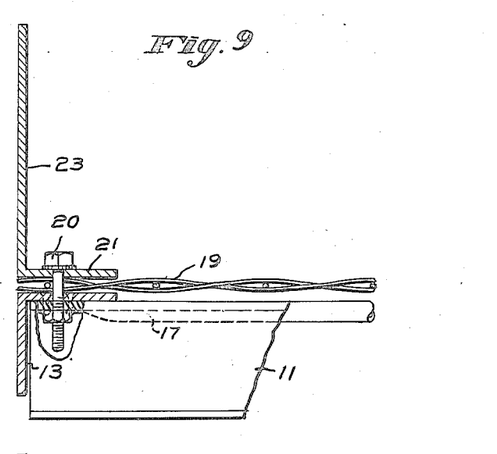
Fig. 9 is a partial transverse section through the foundation wire fabric and its frame.
Figure 10:
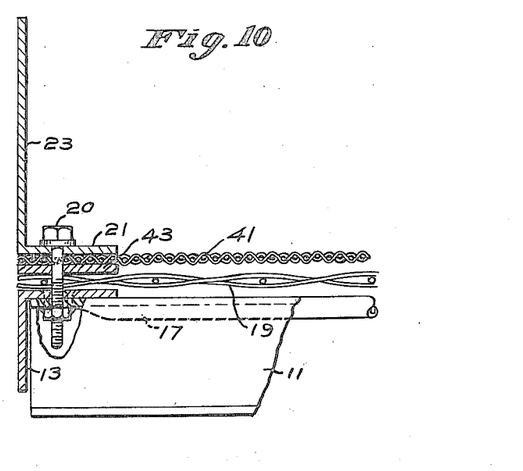
Fig. 10 is a view similar to Fig. 9 showing the construction when a coarser screen clothing is employed than shown in Figs. 7 and 8.

Suitable means may be interposed between the supporting fabric 19 and the clothing 27 of the screen to contribute to the support of the clothing and prevent sagging thereof. This means, in the present instance, comprises bars 35 of wood or other suitable material spaced at appropriate intervals and extending longitudinally of the screen frame and secured to the end members 31 of the latter. Each of the bars 35 may have a series of rubber nubs 37 (Fig. 7) secured thereto in case very fine, delicate screen clothing is employed. In case a coarser screen clothing is employed, the longitudinal bars 39 (Fig. 8) may be of a depth sufficient to be directly engaged by the screen clothing.

Where strong, coarse screen clothing such as indicated at 41 in Fig. 10 is employed, the bars intermediate the screen and supporting fabric may be omitted. In this form of construction it is preferable to provide a metal frame 43 to which the margins of the screen clothing 41 may be secured, and said frame may be interposed and confined between the side members 13 of the upper frame and the flanges 21 of the plates 23.

Next will be described the means for supporting and imparting vibratory movements to the foundation frame and the screen carried thereon. This means, in the present instance, comprises cams 45 (Figs. 2 and 4) having humps or projections 47 formed on the periphery thereof adapted to engage and support the foundation frame through rollers 49 mounted on pins 51 extending through the flanges of the channels 9 referred to. The cams 45 may also be provided with lateral humps or projections 53 (Fig. 4) adapted to engage follower elements, in the present instance, in the form of wedge-shaped lugs 55 (Figs. 3 and 4) secured to the flanges of the channels adjacent the sides of the cams provided with the humps or projections 53.

The cams may be mounted on shafts 57 projecting through the side walls of the casing into bearings 59 conveniently of ball form and mounted in curved sockets in brackets 61 secured to angle bars 63 having depending flanges secured to the sides of the casing.

Figure 1:
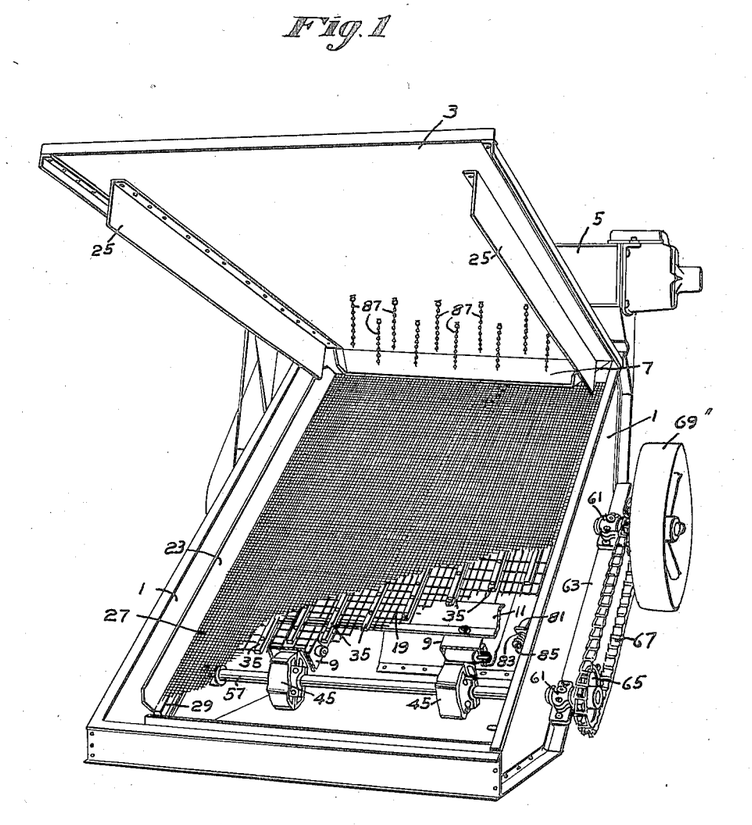
Figure 1 is a perspective view of one good form of separator embodying the invention, the cover of the casing being shown in open position, and certain parts being broken away to disclose parts beyond the same.

In the present instance, four cams are shown, including a pair mounted on a lower shaft and a pair mounted on the upper shaft, and in a sense, these cams constitute four feet to support the foundation frame. The shafts may have sprocket wheels 65 thereon connected by a sprocket chain 67 (Fig. 1), and the upper shaft may have a pulley 69 thereon adapted to be driven by a belt from any suitable source of power.

Suitable means may be provided to prevent the foundation frame from sliding downward off from the supporting cams, this means, in the present instance, comprising eye bolts 71 (Fig. 2) having their upper ends connected to the rear wall of a casing, and their eyes connected by chains 73 with pins 75 mounted in the flanges of the channels 9 adjacent the upper ends thereof.

The cams are preferably rotated in a clockwise direction (Fig. 2), and therefore, have a tendency to slide the foundation frame upwardly. Suitable means may be provided to yieldingly resist such movement of the frame, this means, in the present instance, comprising a pair of eye bolts 77 (Fig. 2) having their eyes secured in brackets 79 depending from one of the transverse bars 11 of the foundation frame. These bolts project through holes in brackets 81 mounted on the sides of the casing and oil springs 83 are confined between said brackets and nuts 85 on said eye bolts, the construction being such that the springs react against the brackets and tend to thrust the eye bolts 75 and the foundation frame downward, these movements being limited by the hanger bolts 71 and chains 73.

As stated, up and down and lateral vibratory movement of the screen is such that it tends to throw the materials together and break the same up into small particles. In some instances means may be provided further to break up and reduce the materials as they flow along the screen. This means, in the present instance, comprises a series of chains or members 87 which may be connected to the cover and hang downward therefrom toward the screen. The length of these chains may vary according to conditions. In some instances they may be sufficiently long so that end portions thereof will lie against the screen, and in other instances they may terminate somewhat short of the upper surface of the screen. As the materials flow from the spill board 7 down along the screen, they come in contact with said chains, and the vibration of the screen tends to agitate said chains so as to break up the materials into small particles and thereby increase the percentage of fines passing through the screen. These chains coming in contact with the clothing may also assist in keeping the meshes thereof in open condition for efficient screening effect. The chains may be variously arranged according to conditions as desired. In the present instance, they are arranged in two staggered rows adjacent the upper end of the screen, but they might be distributed throughout the area of the screen if desired.

In operation, the materials to be graded will flow from the feed box down over the screen, and the fines will pass therethrough and may be delivered through the bottom of the casing, while the tailings will flow along the screen and be delivered at an outlet at the front end of the casing.

The cams on being rotated will impart a succession of thumps or kicks to the foundation frame, the peripheral humps 47 of the cam serving to impart up and down movements to said frame, and the lateral humps 53 serving to impart side movements to said frame. Since the foundation frame and the upper frame have a resilient character, each time the foundation frame is thumped by one of the cam humps, said frames will be energized or vibrated throughout, and the vibratory movements will be transmitted to the screen clothing throughout the same. When the longitudinal bars 35 or 39 are employed for finer screens, the screen clothing which, as stated, is not tensioned, will vibrate up and down and slap against the rubber nubs 37 of the longitudinal bars 35, and the supporting fabric 19 beneath said bars will slap against the same and also slap against the transverse brace bars 17 of the upper frame. The vigorous slapping movements of the screen clothing and the supporting fabric will combine to produce a vigorous shaking or vibration of the clothing, so that it will be impossible for any materials to remain in and clog the meshes of the clothing. In fact, the entire foundation frame, upper frame and screen will receive a combination of vigorous vibratory movements which will maintain the screen clothing in open condition for efficient grading effect.

If coarser clothing, such, for example, as indicated at 41 in Fig. 10 is employed, the clothing which is not under tension will be vigorously vibrated or shaken, and the clothing and the supporting fabric 19 will slap or flap against each other, and the fabric will strike against the brace bars 17 and effectually dislodge materials from the meshes of the clothing.

Since the clothing is secured to its frame but not stretched thereon, it will have a substantial amplitude of vibration so that the materials thereon will be tossed upward and pass repeatedly over the clothing. Since the cams rotate in a clockwise direction (Fig. 2), and the foundation frame rests thereon, the tendency of the cams is to push the foundation frame and screen upwardly when the cam followers are tracking between the humps or projections 47 of the cam. These upward thrusts of the clothing in the general direction of the plane of the clothing further tends to throw the materials upwardly so as to pass repeatedly over the clothing, and therefore, further contribute to the increase in the effective length of the screen for grading materials, and the clothing will have the grading effect of a screen substantially longer than the screen employed. Also, the lateral thrusts imparted to the clothing will toss the materials back and forth laterally so that they will repeatedly pass over laterally spaced portions of the clothing, and the screen will have the grading effect of a wider screen than the one employed.

The upward and lateral tossing of the materials will throw the same against one another and down against the clothing and tend to break up any lumps which may have formed, this being especially true where materials of cohesive or adhesive character are being graded. The reduction effect on the materials by the vibratory motion of the screen will thus materially increase the efficiency thereof and increase the percentage of fines delivered from the separator.

Also, if stringy materials are being graded, the lateral movements imparted to the clothing will shear off the strings and prevent the same from hanging from the clothing and clogging the same.

The complex up and down and side to side motions imparted to the screen by the vibrating mechanism therein are such that every mesh of the clothing is so jarred or shaken that it will be impossible for material to stick to the clothing and clog the meshes thereof, and materials can be graded to a higher degree of fineness than heretofore possible, and materials which hitherto could not be graded by vibrating screens, can be graded by this separator.

Since the screen clothing is not stretched on its frame, the wires of the clothing are not weakened, and local sagging of the clothing is eliminated.

Since the screen clothing is so vigorously shaken, the meshes are maintained in open condition, and do not require brushing, but if it is desired to inspect the clothing or have access thereto, the entire area may be exposed merely by lifting the cover of the casing. This readily permits cleaning the clothing in case it is desired to screen different materials.

In the present instance of the invention, each cam is provided with six humps or projections to thump and vibrate the foundation frame and clothing, but the number of such humps or projections may be varied if desired. The character or extent of vibration to suit different materials may be readily varied simply by changing the speed of rotation of the cams. Preferably the cams are rotated sufficiently slowly so that the follower rolls 51 will have time to drop between the cam projections. This will produce the most vigorous vibration.

The successive thumps or vibrations imparted by the cams to the foundation frame and screen give the same complex motions such that the building in which the separator is used will not be shaken thereby.

The humps on the cams and the arrangement of the cams on their shafts may be such that the thumps imparted to the foundation frame by the cam projections will occur irregularly, and the side thumps may occur out of step so that screen clothing will receive a skew motion in the plane of the clothing. This skew motion may materially contribute to the efficiency of the screen in throwing the materials laterally and shearing stringy materials from the clothing.

When a construction is employed embodying a screen above and closely adjacent to the supporting wire fabric, and the two are vibrated, the amplitude of vibration of one may be greater than the other, so that the wires of the screen and fabric will have a relative motion producing a shearing action which will have a pronounced reduction effect on the materials, and thereby increase the percentage of fines classified.

When the material is flowing down along the screen, and the latter is thrown up and down in its vibratory movements, they will act in a sense as a sheet which will produce a pneumatic effect forcing air through the meshes of the screen, and thereby blowing materials from the meshes and preventing obstruction thereof by the materials.

As stated, the foundation frame is resilient throughout. It will be noted that the longitudinal channels and the transverse members above the same cross at points substantial distances from the ends of said channels and members, the construction being such that when the frame is struck by the projections on the cams, a pronounced vibratory motion is produced, and the members of said frame are flexed, and owing to the elasticity thereof, the end portions thereof projecting beyond their crossing points vibrate in a manner similar to a tuning fork, and the vibrations of the projecting end portions react through the intermediate portions of said members in a manner such that a very lively vibratory effect of the frame is produced throughout.

In the present instance of the invention, the screen shown is made of woven wire, but the term "screen" in the claims is to be regarded in a broad comprehensive sense of sufficient scope to cover any other form of member reticulated or apertured to grade materials.

As stated, preferably the clothing is not stretched or tensioned, but in some instances it may have a slight tension, but in all cases the construction should be such that the clothing may flap or slap as described to dislodge materials from the meshes thereof.

The separator described is strong and simple in construction, readily accessible, and can be easily repaired by an ordinary machinist.

It will be understood that the invention is not limited to the specific embodiment shown, and that various deviations may be made therefrom without departing from the spirit and scope of the appended claims.

What is claimed is:

1. A separator for grading materials, comprising, in combination, a frame, screen clothing carried by the frame, a flexible reticulated fabric supported by the frame in spaced relation to the screen clothing for permitting separate vibrations of the screen clothing and reticulated fabric, and vibrating mechanism for imparting to the frame vigorous movements which cause the screen clothing and reticulated fabric to be vigorously vibrated with an amplitude to cause the vibrations of the two to be transmitted from one to the other for keeping the meshes of the screen clothing in open and cleared condition.

2. A separator for grading materials, comprising, in combination, a frame, screen clothing carried by the frame, a reticulated fabric carried by the frame, clamping means for clamping edge portions of the screen clothing and reticulated fabric to the frame in separated relation for permitting the screen clothing and reticulated fabric to separately vibrate, and vibrating mechanism for imparting to the frame vigorous movements which effect separate vibrations of the clothing and fabric of amplitude to cause the two to vigorously deliver blows from one to the other.

3. A separator for grading materials, comprising, in combination, a frame, screen clothing carried by said frame, wire fabric carried by said frame and mounted beneath the clothing in position to support the clothing, means interposed between said clothing and fabric under the active screening area of the clothing to hold them in spaced relation, and means for supporting the frame and for vigorously vibrating it to cause both the clothing and fabric to vibrate and to flap against said interposed means to maintain the mesh of the clothing in open condition.

4. A separator for grading materials, comprising, in combination, a frame, screen clothing carried by said frame in unstretched condition, a wire fabric carried by said frame so that it may flap relative thereto and mounted beneath the screen clothing to support the latter, and means for supporting the frame and for vigorously vibrating it to cause both the clothing and fabric to vibrate relative to the frame and to each other and to cause the fabric to flap and deliver blows to the clothing.

5. A separator for grading materials, comprising, in combination, a frame comprising side members, and transverse resilient members connected to said side members, a wire fabric mounted on said frame above said transverse members and unconnected thereto, a second frame having screen clothing secured thereto, said second frame being secured to said first-named frame, and means to vibrate said frames and cause said fabric and clothing to receive slapping movements against the parts adjacent thereto to maintain the meshes of the clothing in open condition.

6. A separator for grading materials, comprising, in combination, a plurality of rotary cams, a foundation frame floating on said cams with freedom of movement in different planes, an upper frame mounted on said foundation frame, a wire fabric secured to said upper frame, a screen, including a frame mounted on said upper frame and having clothing thereon, and means to rotate said cams to vibrate said foundation frame, upper fabric frame and screen to impart flapping movement to said fabric and clothing.

7. A separator for grading materials, comprising, in combination a casing, a pair of shafts each having cams mounted thereon provided with peripheral humps or projections, a foundation frame comprising a pair of channels extending over said cams, and resilient transverse members mounted on and secured to the channels, followers carried by the channels and resting upon said cams, and unstretched screen clothing supported by the foundation frame to receive complex vibratory movement from said cams through said foundation frame.

8. A separator for grading materials, comprising, in combination, a screen having clothing and means for supporting the clothing in unstretched condition, an inherently resilient supporting frame for said screen consisting of one set of resilient bars extending crosswise of and secured to another set of bars, cams positioned below said frame to support the same at points located between the middle and the ends of the bars, and means for operating said cams to vibrate the frame and to produce vibrations within the bars about the points of support to produce local and composite vibrations within the unstretched clothing.

9. A separator for grading materials, comprising, in combination, a frame, screen clothing carried by said frame in unstretched condition, wire fabric carried by said frame and mounted beneath the screen clothing to support the latter, and means for shaking the frame to independent flapping movements to the clothing and fabric and relative lateral vibratory movements to shear from the clothing any materials depending therefrom.

10. A separator for grading materials, comprising, in combination, cams, a support resting freely on and floatingly supported by said cams for movement in different planes, a frame mounted on said support, screen clothing secured to said frame, a vibratory supporting structure for the screen clothing secured to the frame beneath the clothing, and means to rotate said cams to cause said clothing and supporting structure to slap against each other to maintain the meshes of the clothing in open condition.

11. A separator for grading materials, comprising, in combination, a casing having a movable cover, a screen mounted in the casing comprising a frame and screen clothing secured thereto, means for vibrating the screen clothing, and a plurality of chains or equivalent flexible members secured to the cover at distributed points in position to contact with the materials upon the clothing to break them up when the cover is in its closed position and arranged to be supported clear of the clothing when the cover is in the open position.

12. A separator for grading materials comprising, in combination, a saddle having transversely disposed resilient members connected together with end portions projecting substantial distances beyond the points of connection of said members, screen clothing carried by said saddle and having means for supporting the clothing in unstretched condition, and rotary cams for floatingly supporting the saddle for movement in different planes and adapted to impart vigorous jolting and vibratory movement to the members of the saddle and through the latter to the clothing to produce local and composite vibrations within the unstretched clothing.

13. A separator for grading materials comprising, in combination, a saddle having spaced resilient bar members connected together with end portions projecting substantial distances beyond the points of connection of said members, screen clothing carried by said saddle and having means for supporting the clothing in unstretched condition, and means for floatingly supporting the saddle for freedom of movement in different planes and adapted to impart vigorous jolting and vibratory movement to the members of the saddle and through the latter to the clothing to produce local and composite vibrations within the unstretched clothing.

14. A separator for grading materials, comprising, in combination, a saddle having spaced resilient bar members connected together with free end portions projecting substantial distances beyond the points of connection of said members, a screen supported by said saddle and connected to said free ends, and means for supporting the saddle and for imparting vigorous jolting and vibratory movements to the members of the saddle and through the latter to said screen said jolting means operable to cause the free ends of the bar member to vibrate independently.

15. A separator for grading materials, comprising, in combination, a saddle consisting of longitudinally-extending bars and transversely-extending bars secured thereto and holding the longitudinally-extending bars in spaced relation, one set of bars having ends projecting substantial distances beyond their points of connection with the other set of bars, a screen supported by said saddle, and means for imparting vibrations to one set of bars to vibrate the saddle and screen and to set up independent vibration within the other set of bars having the projecting ends.

16. A separator for grading materials, comprising, in combination, a saddle consisting of resilient longitudinally extending bars secured in spaced relation by resilient transversely extending bars and one set of bars having their ends projecting a substantial distance beyond the points of connection with the other bars, a screen supported by said saddle, and means for supporting the saddle and for imparting vigorous vibrations to the bars of the saddle and through the bars to the screen by thumping the saddle at such points as will cause the bars to vibrate.

17. A separator for grading materials, comprising, in combination, a saddle formed of connected resilient bars having their ends extending beyond the points of connection, a screen carried by the saddle, and supporting means for the saddle engaging said bars at distributed points throughout their length and operable to vibrate the saddle vigorously and to produce additional vibrations within the bars of the saddle to vibrate the screen.

18. A separator for grading materials, comprising, in combination, a casing, a screen mounted therein, shafts positioned below said screen, a saddle to support the screen formed of connected resilient bars having their ends extending a substantial distance beyond the points of connection, cams to support the saddle mounted upon said shafts in position to engage bars of the saddle at spaced points intermediate the ends of the bars, and means for operating the cams to vigorously vibrate the saddle and to produce additional vibrations within the bars of the saddle to vibrate the screen.

19. A separator for grading materials, comprising, in combination, a resilient saddle formed of connected resilient bars having their ends extending substantial distances beyond the points of connection, screen clothing carried by said saddle in unstretched condition, a wire fabric carried by the saddle and supported beneath the screen clothing to form a flexible support for the screen clothing, and means for supporting the saddle and operable to vibrate the saddle vigorously and to produce additional vibrations within the bars of the saddle to cause the clothing and fabric to flap and to deliver blows one to the other and keep the clothing mesh in open condition.

20. A separator for grading materials, comprising, in combination, a resilient saddle formed of connected resilient bars having their ends extending substantial distances beyond the points of connection, screen clothing carried by the saddle, means carried by the saddle and supported in opposition to said clothing for the latter to flap against, and means for supporting the saddle and operable to vibrate the saddle vigorously and to produce additional vibrations within the bars of the saddle to impart complex flapping movements to the screen clothing.

21. A separator for grading materials, comprising, in combination, a resilient saddle formed of connected resilient bars crossing at points substantial distances from the ends of one of the bars, screen clothing carried by the saddle, resilient members carried by the saddle and supported in opposition to said clothing for the latter to flap against, and means for supporting the saddle and operable to vibrate the saddle vigorously and to produce additional vibrations within the bars of the saddle to impart complex flapping movements to the screen clothing and said resilient members.

22. A separator for grading materials, comprising, in combination, an inherently resilient metal saddle formed of connected cross bars, screen clothing carried by the saddle, means carried by the saddle and supported in opposition to said clothing and in position for relative flapping engagement of the clothing and means, and means for supporting the saddle and operable to vibrate the saddle vigorously and to produce additional vibrations within the bars of the saddle to impart complex vibrations to the clothing and said opposing means.

23. A separator for grading materials, comprising, in combination, screen clothing, a resilient saddle consisting of a pair of longitudinally extending beams spaced apart a distance less than the width of said clothing, resilient transversely extending bars secured crosswise said beams with the ends of the transverse bars projecting a substantial distance from the beams, means carried by the ends of said bars to support the screen clothing, and means for supporting the saddle and for imparting vigorous vibrations to the saddle and through it to the clothing.

24. A separator for grading materials, comprising in combination, screen clothing, a resilient saddle consisting of a pair of longitudinally-extending beams spaced apart a distance less than the width of said clothing and resilient transversely-extending bars secured across the beams with the ends of the bars projecting a substantial distance from the beams, means carried by the bars to support the screen clothing, means for floatingly supporting said saddle including cams positioned to support each beam at spaced points, and means to operate the cams to impart vibrations to the saddle and through it to the clothing.

25. A separator for grading materials, comprising in combination, a screen supporting saddle consisting of resilient transverse bars having longitudinal bars secured thereto at points substantially half-way between the middle point and end of each transverse bar, screen clothing carried by said saddle, cams beneath the saddle adapted to support it floatingly and positioned to operatively engage the longitudinal bars at substantial distances from their ends, and means for operating the cams to produce vibrations within the bars of the saddle that are imparted by the bars to the screen clothing.

26. A separator for grading materials, comprising, in combination, a casing, a screen mounted therein, a channel member beneath the screen between the lateral edges thereof and adapted to support the screen, said channel member having a hollow construction comprising an upper wall and depending flanges, and a cam coöperating with the channel member to impart vibrations to the screen and adapted to enter the hollow channel member to be partly housed thereby and protected from the screened material.

27. A separator for grading materials, comprising, in combination, a casing, a screen mounted therein, cams supporting said screen in at least four points, each cam having peripheral and lateral shoulders, and means coöperating with said cam shoulders to impart vibrations to said screen in different directions.

28. A separator for grading materials, comprising, in combination, a casing, a screen mounted therein, and means positioned under the active screening portion of the screen and operating on the screen in at least four points to vibrate the screen in the direction of the plane of the screen and transversely to the plane of the screen.

29. A separator for grading materials, comprising, in combination, a casing, a screen supporting frame mounted therein and consisting of longitudinal bars having transverse bars secured thereto with the ends of the latter extending substantial distances from the longitudinal bars, screen clothing, means carried by the ends of the transverse bars for holding the screen clothing, shafts below the screen supporting frame, cams upon the shafts arranged to floatingly support the frame through the longitudinal bars and to vibrate the frame and screen clothing.

30. A separator for grading materials, comprising, in combination, a casing, a screen mounted therein, shafts positioned below said screen, cams on said shafts and arranged to lie within the downwardly projected area of the screen, longitudinal supporting members extending lengthwise of the screen to support it and positioned between the lateral edges of the screen, the members being positioned to ride and rest floatingly upon said cams and to be supported and vibrated by the cams, and means for operating the cams to vibrate the supporting members and the screen.

31. A separator for grading materials, comprising, in combination, a casing, a supporting frame mounted therein, a screen mounted on said supporting frame and having a frame and screen clothing thereon, means to shake said supporting frame with up and down and lateral movements including a pair of shafts, cams on said shafts supporting said frame in its plane of vibratory movement, and means to transmit said movements from the supporting frame to said screen.

32. A separator for grading materials, comprising, in combination, a casing, a screen supporting frame mounted therein having a channel provided with depending flanges extending along the same, a cam beneath the channel and projecting into the channel between said flanges to be partly housed thereby and operable to impart vibratory movements to said supporting frame, and a screen resting on said supporting frame and receiving vibratory movements therefrom.

33. A separator for grading materials, comprising, in combination, a casing, a screen supporting frame mounted therein comprising longitudinal members and transverse members secured thereto and having marginal portions extending over the longitudinal members and in spaced relation thereto to afford a yielding surface, a screen supported from said yielding surface of the transverse members and independent thereof, and cams beneath and coöperating with the longitudinal members to vibrate and support the frame and screen.

34. A separator for grading materials, comprising, in combination, a casing, a supporting frame mounted therein comprising channels, and cross-bars secured to said channels and curved upward to form a yielding surface spaced from the channels, a screen resting on said cross-bars, and cams coöperating with said channels to vibrate said supporting frame and screen.

35. A separator for grading materials, comprising, in combination, a casing, a screen mounted therein, and means for shaking said screen with up and down and lateral movements comprising a shaft, cams on said shaft having peripheral projections and lateral projections thereon, said lateral projections extending from corresponding sides of said cams to impart movements to said screen in the same general lateral direction.

36. A separator for grading materials, comprising, in combination, a casing, a screen supporting frame mounted therein and consisting of longitudinal channel bars having transverse bars secured thereto with the ends of the transverse bars extending substantial distances from the longitudinal bars, screen clothing, means carried by the ends of the transverse bars for holding the screen clothing, shafts below the screen supporting frame, cams upon the shafts positioned to engage the channel bars to support and vibrate the screen supporting frame and adapted to be protected from the falling screened material and to be partly housed by the channeled construction of the channel bars.

37. A separator for grading materials, comprising, in combination, a casing, a screen supporting frame mounted therein and consisting of longitudinal channel bars having transverse bars secured thereupon with the ends of the transverse bars extending substantial distances from the longitudinal bars, screen clothing, means carried by the ends of the transverse bars for holding the screen clothing, shafts below the screen supporting frame for supporting it in an inclined position, cams upon the shafts positioned to engage the channel bars to support and vibrate the screen supporting frame and adapted to be protected from the falling screened material and to be partly housed by the channeled construction of the channel bars, and flexible anchoring means connected to the screen supporting frame to limit movement of the frame in the direction in which it is inclined.

In testimony whereof, I have signed my name to this specification.

THOMAS L. STURTEVANT.